United States Patent [19]
Avery et al.

[11] 3,936,263
[45] Feb. 3, 1976

[54] APPARATUS IMPROVEMENTS IN A ROTARY BLOW MOLDING MACHINE

[75] Inventors: Michael J. Avery, Forrestville; Lawrence A. Martino, East Hartford, both of Conn.

[73] Assignee: Monsanto Company, St. Louis, Mo.

[22] Filed: Apr. 9, 1975

[21] Appl. No.: 566,255

Related U.S. Application Data
[62] Division of Ser. No. 480,605, June 19, 1974.

[52] U.S. Cl. ......... 425/296; 425/DIG. 212; 425/342
[51] Int. Cl.² ................................ B29D 23/03
[58] Field of Search ........ 425/340, 342, 306 B, 296, 425/302 B, 326 B, 387 B, DIG. 212

[56] References Cited
UNITED STATES PATENTS

| | | | |
|---|---|---|---|
| 2,750,624 | 6/1956 | Coates et al. | 264/99 |
| 3,097,398 | 7/1963 | Ingelsby | 425/170 |
| 3,457,591 | 7/1969 | Szajna | 425/326 |
| 3,488,803 | 1/1970 | Cote | 425/305 |
| 3,585,682 | 6/1971 | Martelli | 425/326 B X |
| 3,741,705 | 6/1973 | Duekers | 425/326 B |
| 3,752,629 | 8/1973 | Gordon | 425/806 X |
| 3,763,297 | 10/1973 | Del Piero et al. | 264/98 |
| 3,777,609 | 12/1973 | Michel et al. | 425/302 B |
| 3,785,761 | 1/1974 | Logomasini et al. | 425/387 B |

*Primary Examiner*—Richard Bernard Lazarus
*Attorney, Agent, or Firm*—Michael J. Murphy

[57] ABSTRACT

Plastic is cleanly severed between closely adjacent inner sections of radially operable blow molds in a rotary molding machine during mold opening by means of a wiper blade on the trailing face of the inner section of one mold angularly projecting toward and having its rear edge engaging the forward face of the next succeeding inner mold section, each such inner section being spring mounted and arranged because of the mold-opening cam configuration, to spring outwardly such that the rear edge of the blade slides along the forward face of the succeeding mold to consistently shear the plastic between such edge and such forward face.

5 Claims, 3 Drawing Figures

APPARATUS IMPROVEMENTS IN A ROTARY BLOW MOLDING MACHINE

CROSS REFERENCE TO RELATED APPLICATION

This is a division of application Ser. No. 480,605, filed June 19, 1974.

U.S. Ser. No. 409,652, filed Oct. 25, 1973.

BACKGROUND OF THE INVENTION

This invention relates to blow molding apparatus and more particularly to severing plastic between adjacent sections of a multi-station machine of the type operable in a vertical plane wherein the sections move radial to the axis during opening and closing.

In U.S. Pat. No. 3,785,751 and commonly assigned U.S. Pat. No. 409,652, filed Oct. 25, 1973, the inner sections of each of a plurality of closely adjacent blow molds are disclosed as resiliently mounted such that during traversal of an outwardly directed mold-opening cam portion by followers associated with the outer mold sections in the vicinity of 10 o'clock when looking at the rotary machine head-on, each inner mold section releases incrementally outwardly to cause plastic to break in the vicinity of the parting line of the next succeeding, still fully-closed mold. Such severing is advantageous because reliance for this on continuously sharp mold pinch lands is avoided, such lands tending to become dull after extended periods of use.

However, it has since been observed that when rotary molding machines of this general type are cycled at high rates, the glob of plastic in the tight area between closely adjacent mold sections (such closeness minimizing the amount of flash generated which requires reprocessing) is still quite pliable at the mold-opening portion of the cycle, due in large part to the fact such glob is not contacting any mold surface at all and thus is not being conductively cooled thereby. The result is that complete severance due to differential movement of adjacent molds is impeded, the material tending to only partially separate and to remain attached via strings on either side of the intended break point. As is also known, with this type of radial rotary molding machine the molded article is generally retained in the outer mold sections during mold opening by means of coaction between the plastic and a projection, such as an undercut, in the mold surface, thereby facilitating subsequent ejection from the machine at about the 12 o'clock position. With such incomplete severing as just described, any residual stringing of the material inhibits retaining the molded article in the outer section and frequently the strings prevent the undercut from functioning as intended, and instead of being in the outer section, the molded article is in the inner section at the point where it is to be ejected from the machine, which condition is not supportive of the accepted way of removing the molded products from the machine.

SUMMARY OF THE INVENTION

Now, however, apparatus improvements have been developed for severing plastic between adjacent inner mold sections of radially operable molds in a vertically oriented rotary blow molding machine.

Accordingly, it is a principal object of this invention to provide improved means for separating plastic between adjacent molds in such a rotary blow molding machine.

Another object of this invention is to provide apparatus improvements in machines of the aforementioned type which depend for plastic severance on the coaction between resiliently mounted inner mold sections and the outwardly directed contour of a mold-opening portion of an operating cam.

An additional object of this invention is to provide simple means as a self-contained portion of an inner mold assembly for consistently and cleanly severing plastic between adjacent molds in a machine of the aforementioned type which is not dependent on continued sharpness of pinch lands to cut through the plastic.

Other objects will in part be obvious and will in part appear hereinafter from the following disclosure and claims.

These and other objects are accomplished in a rotary machine for blow molding hollow articles from an extruding tube of thermoplastic material which includes a wheel arranged for rotation and having a plurality of arms, each carrying a partible mold comprising an inner section and an outer section radially movable along the arm, cam means generally surrounding the wheel including a mold-opening cam portion, means associated with each outer mold section for periodically engaging such mold-opening portion during rotation of the wheel and spring means between the wheel axis and each inner mold section for urging each inner section incrementally outwardly as the means associated with each outer mold section traverses the mold-opening cam portion, by providing the improvement in said machine which comprises, in combination, a wiper blade on the back face of each inner mold section angularly projecting toward and abutting the front face of the next adjacent succeeding inner mold section to shear the plastic against said front face during such incremental outward movement.

BRIEF DESCRIPTION OF THE DRAWINGS

In describing the overall invention, reference will be made to the accompanying drawings wherein.

DESCRIPTION OF THE PREFERRED EMBODIMENT

With respect to an environment in which the present invention is operative, reference is here made to U.S. Pat. No. 3,785,761, and more particularly to the following parts thereof incorporated herein by reference: col. 3 in its entirety, col. 4 through line 60 inclusive, and FIGS. 1–3. Numerals used in the present description referring to components described and illustrated in the incorporated parts of such patent are the same as used therein.

Figure 1:
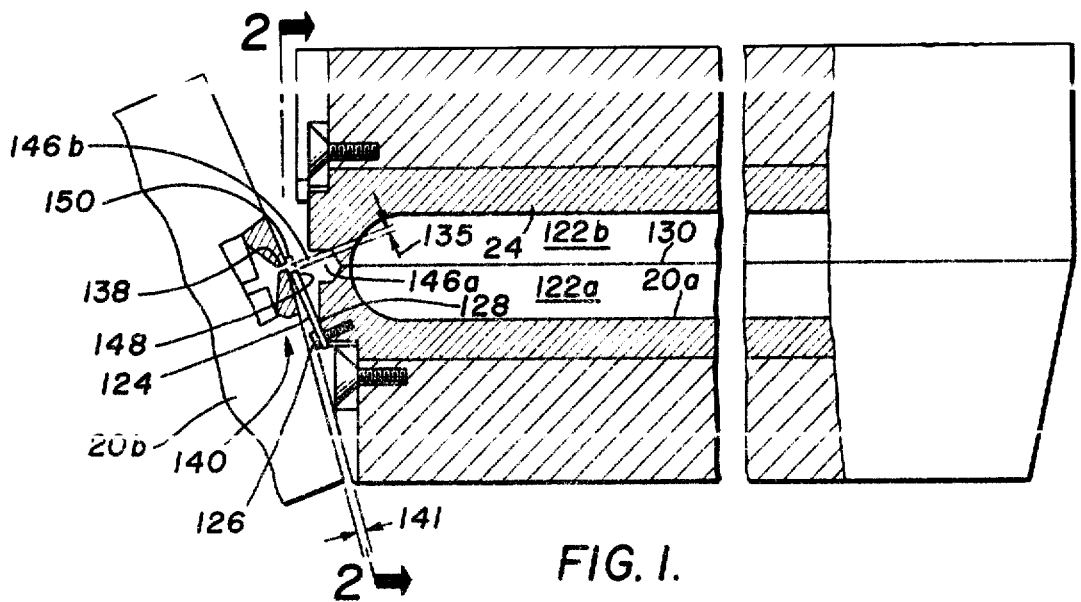
FIG. 1 is a schematic, elevational view, partly in section, showing apparatus embodying the present invention arranged between a pair of adjacent molds of a rotary molding machine.

Referring now to the present drawings, there is shown in FIG. 1 a pair of adjacent inner mold sections 20a and 20b circumferentially spaced from each other as indicated at 141, a distance on the order of one-eighth to three-fourth inch, in order to minimize the waste flash formed between adjacent molds. Each inner section 20 cooperates with an opposing outer section 24 to define one complete mold and each such section has a cavity portion 122a, 122b, the surface of which together define the contour of the article being molded.

According to principles of the present invention, each inner section 20 of the multi-station assembly has wiper blade 124 secured via screws 126 to its rear or trailing face 128 at an acute angle to mold parting line 130. Blade 124 (FIG. 2) in installed position straddles longitudinal axis 131 of cavity portion 122 by a few inches on either side and, except during severing as will be further described, never projects beyond such parting line 130 toward outer mold section 24, since this would interfere with concentrically locating the parison in the mold on issuing from the extruder head.

Figure 2:
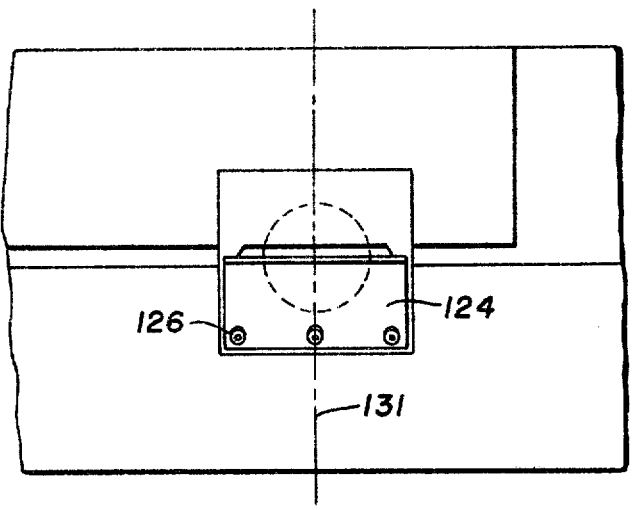
FIG. 2 is a partial end view along 2—2 of FIG. 1.

Through blade 124 may be made of a number of alternative materials including, for example, rubber, it is preferably formed of spring steel and is assembled to the position shown in FIGS. 1 and 2, such that its shearing edge 133 (FIG. 3) is loaded, i.e. put under compression, an amount on the order of 0.003 to 0.010 inch against forward face 129 of the next succeeding inner mold section, such engaged mold face in the illustrated embodiment being defined by inner mold section pinch blade 132. This compressive mounting of blade 124 could also be accomplished using a coil spring, not shown, inserted, for example, between front face 148 of blade 124 and the opposite trailing mold face 128 so as to urge blade 124 rearwardly against the forward face of the next succeeding mold section by the desired preset amount of force. Compressive loading of blade 124 against the face of the succeeding mold is important since with the type of incremental movement of each mold section 20 in a true radial direction with respect to the axis of the machine as a result of decompression of springs 26, a space will exist between the mold sections if the blade 124 is made an integral rigid part of the section to which it is attached and is not spring loaded against the face of the next succeeding section, and it is this space which will prevent the desired positive shearing action from occurring.

Immediately adjacent mold sections 20 in FIG. 1 are shown in compressed condition, i.e. prior to movement of the assembly of which outer section 24 is a part thereof away from a section 20 as a result of cooperative rolling engagement between followers 50 and mold opening cam portion 52, or in other words, which follower 66 is in contact with mold-closed cam portion 70. In such loaded, compressed position, top face 134 and more particularly shearing edge 133 of blade 124 is below the parting line 130 of the next succeeding section 20 preferably by an amount 135 equal to one half the extent of movement of a section 20 outwardly when springs 26 are released, e.g. on the order of 1/32 to 1/16 inch. If face 134 is set back too far in the direction of arrow 136 with respect to pinch lands 138 of the next mold section, shearing via blade 124 will not occur at all, whereas if it is positioned too far in the opposite direction, interference with centering of the parison in the mold during the mold-closing portion of the cycle will occur, as previously mentioned. It is conceivable, however, that the edge coplanar with 133 representing the other extremity of thickness of angularly mounted blade 124 could lie right on parting line 130 of the mold on which it is mounted. Thus, by setting the angle of projection of blade 124 at between about 10° to 75° to the parting line and holding the gap 141 between adjacent inner mold sections at about one-eighth to three-fourth, as screws 126 are threaded into inner mold section 120, compressive loading of wiper blade 124 in direction 140 will occur.

Pinch lands 142 (FIG. 3) in each opposing section are forward of blade 124 at the rear of cavity portions 122a and 122b, and are preferably separated from each other when the mold is closed, i.e. dimension 144, on the order of 0.001 to 0.006 inch to avoid cutting through the plastic in this area during mold closing, such severing desirably occurring in a manner to be described via blade 124. This range for dimension 144 is important, since if it is excessive, difficulty will be encountered in breaking the tail portion of the article squeezed within cutouts 146a and 146b during mold closing away from the base of the molded article later on downstream of the machine.

Figure 3:
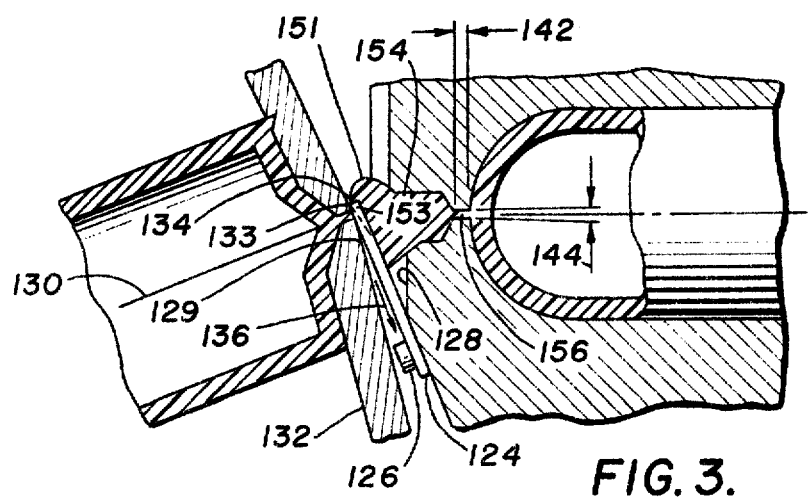
FIG. 3 is an enlarged detailed view of the immediate area between adjacent molds of FIG. 1 during plastic severance.

In overall operation of machine 10 of the referenced patent in which the molds and parts in FIGS. 1-3 are installed, during traversal of the initial portion of the mold-opening part 52 of the cam by followers 50, outer mold assembly 22 because of the radially outwardly increasing shape of cam portion 52, is moving outwardly compared with the position of the next subsequent mold assembly, or in other words the subsequent mold assembly will be in the position of the first mold on the left side in FIG. 3 of the present drawings while the prior mold assembly will just be starting to separate along the parting line of the blow mold. The coil springs 26 of the first inner mold assembly 18, accordingly, will have expanded or decompressed in comparison with the compressed condition of the springs of the next subsequent still-closed mold assembly.

With reference to FIG. 1 of the present drawings, this incremental outward movement of inner mold section 20 and therefore of blade 124 causes shearing edge 133 of top face 134 to move upwardly along the surface of the pinch blade of the following inner mold section a total amount equal to the extent of compression of springs 26, to the position shown in outline at 150 in FIG. 1. If 135 in FIG. 1, i.e. the amount edge 133 is set below parting line 130 when the springs 26 of both adjacent sections are compressed, equal one-half the amount of travel when springs 26 are relaxed, edge 133 then will terminate its movement beyond parting line 130 by an amount also equal to one-half the amount of total movement. Thus, when the succeeding section 20b springs fully outwardly prior to loading the mold with plastic for the next cycle, the relative positions of edge 133 and parting line 130 will again be as illustrated in full lines in FIG. 1, and no interference with parison positioning in the inner mold sections will occur.

Referring to FIG. 3, with respect to the glob 151 of plastic within gap 141 between the mold sections, such rather abrupt upward (or outward with respect to the wheel axis) movement beyond parting line 130 causes top face 134 of blade 124 to smash into the portion of glob 151 within dotted lines 153 in FIG. 3, and shear it away at parting line 130 from the plastic compressed between the pinch lands at the forward end of the next succeeding mold as edge 133 of the blade compressively scrapes across the forward face 129 of such next succeeding mold, thereby cleanly shearing the plastic in front of it during the initial stage of the mold-opening portion of the machine cycle.

After ejection of the article from the machine in the vicinity of the 12 o'clock position, tail section 154 is relatively easily broken away from the rest of the article at web 156 in downstream equipment. In the meantime, the empty mold continues to traverse a circular path around the machine and eventually closes again at about the one-thirty position on another parison portion to start another cycle, springs 26 going into compression to then cause the wiper blade to take the position illustrated in FIG. 1 with respect to the next succeeding mold during actual blowing of the article.

Various modifications and alterations will be readily suggested to persons skilled in the art. It is intended therefore, that the foregoing be considered as exemplary only and that the scope of the invention be ascertained from the following claims.

What is claimed is:

1. In a rotary machine for blow molding hollow articles from an extruding tube of thermoplastic material which includes a wheel arranged for rotation and having a plurality of arms, each arm carrying a partible mold comprising an inner section and an outer section radially movable along said arm, cam means generally surrounding said wheel including a mold-opening cam portion, means associated with each outer mold section for periodically engaging said mold-opening portion during rotation of said wheel and spring means between the axis of said wheel and each inner mold section for urging each inner section incrementally outwardly as said means associated with each outer mold section traverses the initial section of the mold-opening cam portion, the improvement in said machine which comprises, in combination, a wiper blade on the back face of each inner mold section angularly projecting toward and abutting the front face of the next succeeding inner section to shear the plastic against said front face as a result of such incremental outward movement.

2. The apparatus of claim 1 wherein the shearing surface of said blade terminates beneath the plane of separation of the inner and outer sections of each mold when such spring means are in compression, by an amount on the order of one-half the extent of movement of an inner mold section when such spring means are decompressed.

3. The apparatus of claim 1 wherein each mold section includes a cavity portion having a pair of opposing pinch land portions at the rear thereof, said wiper blade being rearward of such opposing pinch land portions.

4. The apparatus of claim 1 wherein the wiper blade is made of spring steel.

5. The apparatus of claim 1 wherein the angular mounting of said blade is between 60° to 75° with respect to the mold parting line.

* * * * *